(12) United States Patent
Loetz et al.

(10) Patent No.: US 12,104,546 B2
(45) Date of Patent: Oct. 1, 2024

(54) GASEOUS FUEL ENGINE OPERATING STRATEGY FOR IMPROVED DERATING PERFORMANCE USING VARIED RATIO FUEL BLEND

(71) Applicant: Caterpillar Inc., Peoria, IL (US)

(72) Inventors: Andrew Joseph Loetz, West Lafayette, IN (US); Jaswinder Singh, Dunlap, IL (US); David Todd Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 17/895,551

(22) Filed: Aug. 25, 2022

(65) Prior Publication Data

US 2024/0068418 A1    Feb. 29, 2024

(51) Int. Cl.
*F02D 19/08*      (2006.01)
*F02D 19/06*      (2006.01)

(52) U.S. Cl.
CPC ....... *F02D 19/081* (2013.01); *F02D 19/0602* (2013.01); *F02D 19/0644* (2013.01)

(58) Field of Classification Search
CPC ............... F02D 19/081; F02D 19/0602; F02D 19/0644; F02D 19/08; F02D 19/06
See application file for complete search history.

(56) References Cited

U.S. PATENT DOCUMENTS

| | | |
|---|---|---|
| 5,293,857 A | 3/1994 | Meyer |
| 5,445,019 A | 8/1995 | Glidewell et al. |
| 5,666,923 A | 9/1997 | Collier, Jr. et al. |
| 5,787,864 A | 8/1998 | Collier, Jr. et al. |
| 6,964,261 B2 | 11/2005 | Warne et al. |
| 7,111,452 B2 | 9/2006 | Miyoshi et al. |
| 7,290,504 B2 | 11/2007 | Lange |
| 7,316,218 B2 | 1/2008 | Yasushi |
| 8,118,012 B2 | 2/2012 | Suzuki et al. |
| 8,702,916 B2 | 4/2014 | McBride et al. |
| 9,593,629 B2 | 3/2017 | Rasmussen et al. |
| 9,790,883 B2 | 10/2017 | Rebinsky |
| 9,932,910 B2 | 4/2018 | Hunter |

(Continued)

FOREIGN PATENT DOCUMENTS

| | | |
|---|---|---|
| EP | 2453124 A1 | 5/2012 |
| FR | 3083268 B1 | 11/2020 |

(Continued)

OTHER PUBLICATIONS

European Search Report for EP Patent Appln. No.23179080.9, mailed Jan. 23, 2024 (8 pgs).

*Primary Examiner* — Jacob M Amick
(74) *Attorney, Agent, or Firm* — Brannon Sowers & Cracraft PC

(57) ABSTRACT

Operating a gaseous fuel engine system includes conveying hydrogen fuel and hydrocarbon fuel into a cylinder in a gaseous fuel engine for combustion. Operating a gaseous fuel engine system further includes receiving an increased engine power output request, boosting a power output of the gaseous fuel engine by varying a ratio of the hydrogen fuel and the hydrocarbon fuel combusted in the cylinder, and varying an in-cylinder combustion parameter based on the varying a ratio. Perturbation to a performance profile of the gaseous fuel engine is thereby limited. Related apparatus and control logic is also disclosed.

18 Claims, 3 Drawing Sheets

(56) References Cited

U.S. PATENT DOCUMENTS

| | | |
|---|---|---|
| 10,041,432 B2 | 8/2018 | Puckett et al. |
| 10,260,446 B2 | 4/2019 | Ottikkuti et al. |
| 10,760,480 B2 | 9/2020 | Malm et al. |
| 10,876,491 B1 | 12/2020 | Claude et al. |
| 2010/0180838 A1 | 7/2010 | Lewis, III et al. |
| 2015/0006849 A1 | 3/2015 | Robart |
| 2015/0037716 A1 | 12/2015 | Smith et al. |
| 2015/0377161 A1 | 12/2015 | Smith |
| 2017/0096334 A1 | 4/2017 | Edalati |
| 2021/0087981 A1 | 3/2021 | Wang et al. |
| 2023/0175431 A1* | 6/2023 | Klingbeil ............ F02D 41/0055 60/273 |

FOREIGN PATENT DOCUMENTS

| | | |
|---|---|---|
| JP | 2003148187 A | 5/2003 |
| WO | 2022067021 A1 | 3/2022 |

* cited by examiner

GASEOUS FUEL ENGINE OPERATING STRATEGY FOR IMPROVED DERATING PERFORMANCE USING VARIED RATIO FUEL BLEND

STATEMENT OF GOVERNMENT INTEREST

This invention was made with government support under Contract No. DE0009422 awarded by the Department of Energy. The government has certain rights in this invention.

TECHNICAL FIELD

The present disclosure relates generally to operating a gaseous fuel engine on a gaseous hydrogen fuel and a gaseous hydrocarbon fuel, and more particularly to varying an in-cylinder combustion parameter to accommodate a varied ratio of gaseous hydrogen and hydrocarbon fuels in a gaseous fuel blend with reduced performance penalty.

BACKGROUND

Gaseous fuel engines are used throughout the world for a range of purposes including vehicle propulsion, operation of pumps and compressors, and electrical power generation to name a few examples. Gaseous fuels used in such engines have traditionally included gaseous hydrocarbon fuels such as natural gas. Such fuels tend to produce fewer emissions of certain types relative to liquid hydrocarbon and similar fuels and are generally widely available. A typical engine arrangement includes apparatus for feeding gaseous fuel into an intake system of the engine, or in some instances directly injecting it, into cylinders where the fuel is ignited to produce a controlled combustion reaction driving pistons to rotate a crankshaft. Many different engine configurations and operating regimes have been proposed over many years.

Research efforts more recently have focused on the exploitation of various alternative fuels, including gaseous hydrogen fuels. Hydrogen combustion tends to produce few undesirable emissions, and notably substantially zero so-called greenhouse gas or "GHG" emissions. Using hydrogen as a fuel in reciprocating engines nevertheless has proven challenging. Hydrogen tends to be less energy dense than traditional hydrocarbon fuels, has a faster flame speed, and may require specialized storage and handling.

Various research efforts have also sought to combine hydrogen with other fuels for combustion. Many engines are purpose-built to a certain fuel type or range of fuel types. The engine configuration and hardware arrangement itself may be highly specialized for natural gas as compared to diesel, for example. Moreover, engine control strategies for operating on one type of fuel may be poorly suited to different fuel types. Even relatively modest variations in fuel composition in gaseous fuel engines can cause performance degradation or efficiency penalties. One example engine potentially operating on hydrogen or various blends is set forth in co-pending and commonly owned U.S. patent application Ser. No. 17/673,517 to Cress, filed Feb. 16, 2022. The art provides ample opportunity for improvements and alternative strategies.

SUMMARY

In one aspect, a method of operating a gaseous fuel engine system includes conveying a gaseous hydrogen fuel (H2) and a gaseous hydrocarbon fuel (HC) into a cylinder in a gaseous fuel engine for combustion. The method further includes receiving an increased engine power output request, and boosting a power output of the gaseous fuel engine based on the increased engine power output request at least in part by varying a ratio of the H2 and the HC combusted in the cylinder. The method further includes varying an in-cylinder combustion parameter based on the varying a ratio of the H2 and the HC, and limiting perturbation to a performance profile of the gaseous fuel engine based on the varying an in-cylinder combustion parameter.

In another aspect, a gaseous fuel engine system includes a gaseous fuel engine having a cylinder formed therein, and a fuel system having a first gaseous fuel admission valve and a second gaseous fuel admission valve together structured to admit a gaseous hydrogen fuel (H2) and a gaseous hydrocarbon fuel (HC) at a range of ratios to the cylinder for combustion. The gaseous fuel engine system further includes an electronic control unit structured to receive an engine power output request, and to output a fueling control command, based on the engine power output request, to at least one of the first gaseous fuel admission valve or the second gaseous fuel admission valve to vary a power output of the gaseous fuel engine. The electronic control unit is further structured to output an in-cylinder combustion command varying an in-cylinder combustion parameter based on a varied ratio of the H2 and the HC admitted via the first gaseous fuel admission valve and the second gaseous fuel admission valve.

In still another aspect, a gaseous fuel engine control system includes an electronic control unit structured to receive an engine power output request for a gaseous fuel engine operating on a gaseous hydrogen fuel (H2) and a gaseous hydrocarbon fuel (HC). The electronic control unit is further structured to output a fueling control command to a gaseous fuel admission valve to vary a power output of the gaseous fuel engine based on the engine power output request. The electronic control unit is further structured to output an in-cylinder combustion command varying an in-cylinder combustion parameter based on a varied ratio of the H2 and the HC admitted in response to the fueling control command to limit perturbation to a performance profile of the gaseous fuel engine.

DETAILED DESCRIPTION

Figure 1:
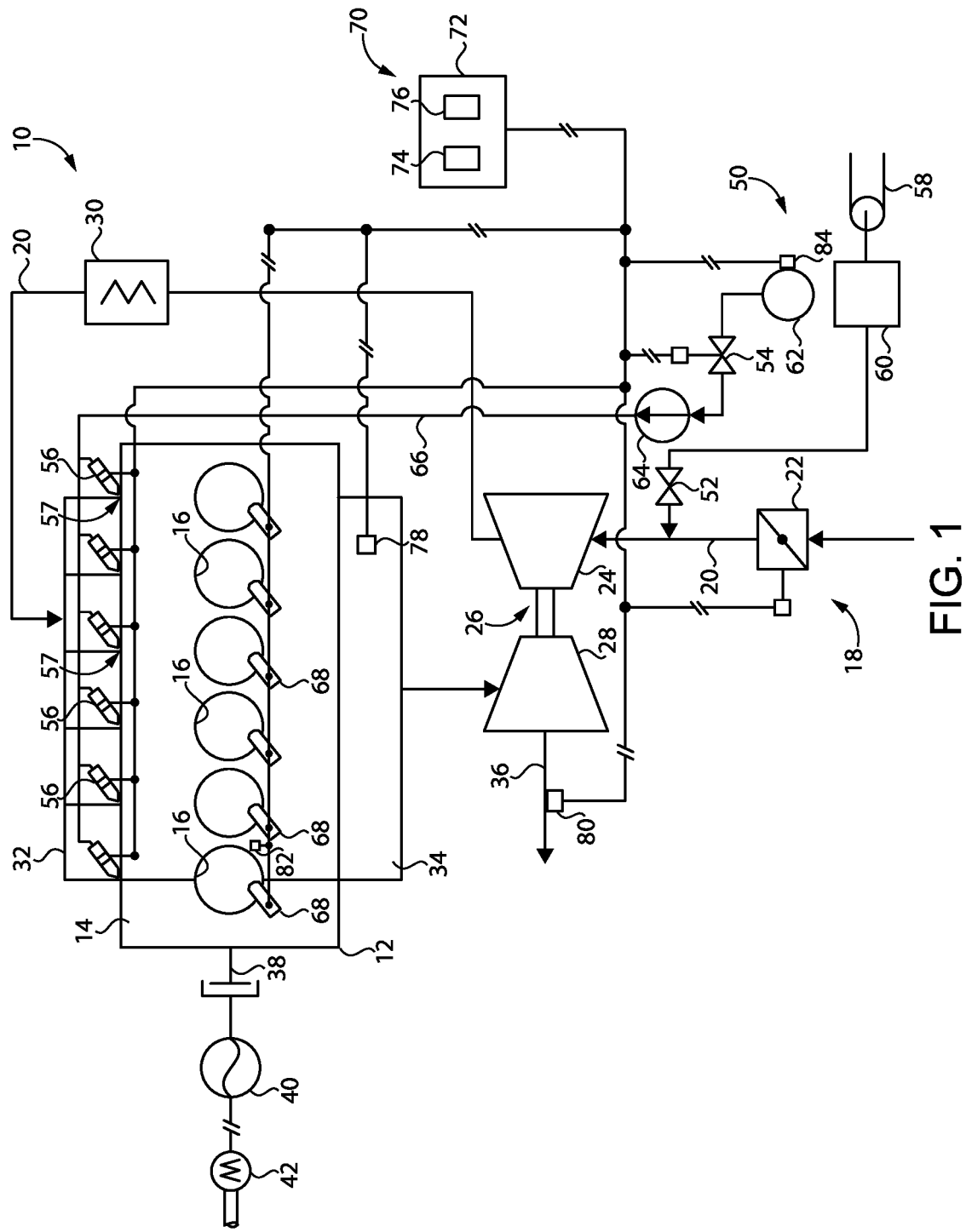
FIG. 1 is a diagrammatic view of a gaseous fuel engine system, according to one embodiment.

Referring to FIG. 1, there is shown a gaseous fuel internal combustion engine system 10, according to one embodiment. Engine system 10 includes a reciprocating gaseous fuel engine 12 having an engine housing 14 with a plurality of cylinders 16 formed therein. Pistons will be positioned within cylinders 16 and movable between a bottom-dead-center position and a top-dead-center position, typically in a conventional four-stroke engine cycle. Cylinders 16 can include any number, in any suitable arrangement such as an in-line pattern, a V-pattern, or still another. Cylinders 16 are referred to hereinafter, at times, in the singular. Engine 12 also includes a driveshaft 38 rotatable based upon the movement of pistons in cylinders 16 to rotate a load 40. Load 40 may include an electrical generator coupled to an electrical device such as an electric motor 42. An electrical generator operated by engine 12 could also be used to supply electrical power to a local or a regional electrical grid. Engine system 10 could also be implemented for vehicle propulsion, operation of a pump or a compressor, or for various other purposes.

Engine system 10 also includes an intake system 18 having an intake conduit 20 structured to convey a gaseous fuel or a gaseous fuel blend to cylinders 16. Intake system 18 may also include an air:fuel ratio (AFR) valve 22 or other intake airflow control element that can be varied in position to adjust airflow into intake conduit 20 to vary an AFR of engine 12. Intake system 18 also includes a compressor 24 positioned at least partially in intake conduit 20 and coupled to a turbine 28 in a turbocharger 26. Turbine 28 rotates in response to a flow of exhaust from engine 12 to rotate compressor 24 to pressurize intake air to be supplied to engine 12 through intake conduit 20 via an aftercooler 30. Intake system 18 also includes an intake manifold 32 attached to engine housing 12. A plurality of intake ports 57 fluidly connect between intake manifold 32 and each respective cylinder 16. Intake conduit 20, or intake conduit 20 and intake ports 57 together, form a conduit that can carry air and at least one gaseous fuel, commonly two, to each cylinder 16. An exhaust manifold 34 is also attached to engine housing 14 and conveys exhaust to an outgoing exhaust conduit 36 to be passed through turbine 28.

Engine system 10 also includes a fuel system 50. Fuel system 50 includes a first gaseous fuel admission valve 52. In the illustrated embodiment first gaseous fuel admission valve 52 includes a fumigation admission valve for fumigation delivery of a gaseous fuel or gaseous fuel blend coupled to intake conduit 20 at a fumigation admission location upstream of compressor 24. Fuel system 50 also includes a second gaseous fuel admission valve 56. In the illustrated embodiment a plurality of gaseous fuel admission valves 56 are provided, hereinafter referred to at times in the singular, and each configured as a port injection admission valve at a respective port injection location of one of intake ports 57. In other embodiments each respective second gaseous fuel admission valve 56 may be a direct injection admission valve positioned to extend into a respective cylinder 16 to inject gaseous fuel at a direct injection location. Yet another fuel admission valve is shown at 54. Embodiments might include both port injection and direct injection gaseous fuel admission valves, a gaseous fuel admission valve structured to inject fuel into intake manifold 32, combinations of these or still other arrangements. In a practical implementation, one of a first gaseous fuel admission valve or a second gaseous fuel admission valve will include a fumigation admission valve, and the other of the first gaseous fuel admission valve or the second gaseous fuel admission valve will include an injection admission valve such as a port injector or a direct injector.

Fuel system 50 includes a first gaseous fuel supply 58 structured to supply a gaseous fuel or a gaseous fuel blend to intake conduit 20 by way of gaseous fuel admission valve 52 after passing through a filter 60 or other processing equipment. In an embodiment fuel supply 58 may be a line gas supply providing a gaseous hydrocarbon fuel (HC) such as natural gas, methane, ethane, or various blends including blends of HC and a gaseous hydrogen fuel (H2) such as gaseous molecular hydrogen. A line gas supply as contemplated herein could supply natural gas (NG) from a gas field, mine gas, landfill gas, biogas, dynamically blended H2 and HC from a hydrogen reformer and a natural gas pipeline, or still others. Fuel system 50 also includes a second gaseous fuel supply 62. Second gaseous fuel supply 62 may contain pressurized H2 or blends thereof, and is structured to supply the H2 by way of admission valve 54 to a pump 64. Pump 64 can further pressurize H2 and supply the same by way of a fuel conduit 66 to each respective fuel admission valve or port injector 56. It should be appreciated that the terms "first," "second," "another" and like terms are used herein for descriptive convenience and do not require any particular identity or ordering of elements.

In view of the foregoing description, it will be appreciated that a gaseous fuel or a blend containing HC may be supplied from fuel supply 58 for fumigation admission into intake conduit 20 via fuel admission valve 52. H2, or potentially another gaseous fuel blend that contains H2, can be supplied by way of fuel admission valve 54 and fuel admission valves 56 to cylinders 16. Gaseous fuel admission valve 52 and gaseous fuel admission valve(s) 56 may be together structured to admit H2 and HC at a range of ratios to cylinder(s) 16 for combustion, the significance of which will be further apparent from the following description.

As further discussed herein, engine system 10 is uniquely configured by way of varying a ratio of H2 and HC and varying in-cylinder combustion parameters to operate gaseous fuel engine 12 with reduced or zero perturbation to a performance profile of gaseous fuel engine 12, particularly during increases or decreases in power output demand. The performance profile can include one or more factors relating to efficiency, power output, temperatures such as exhaust temperature, or emissions. In an embodiment, the performance profile includes an emissions level. The emissions level might include, for example, a parts per million (PPM) or a parts per billion (PPB) threshold of an exhaust constituent such as NOx or greenhouse gases (GHG), or still another.

Engine system 10 further includes a plurality of sparkplugs 68 each associated with one respective cylinder 16. Sparkplugs 16 can include prechamber sparkplugs having a prechamber supplied with fuel and air from a main combustion chamber (cylinder 16) during a piston compression stroke, open sparkplugs, or potentially prechamber ignition devices having a prechamber supplied with fuel via a dedicated fuel conduit extending to each respective device. Those skilled in the art will be familiar with the operation of prechamber sparkplugs, prechamber ignition devices, and various other spark-ignition devices that employ an electrical spark at an electrode spark gap to ignite an ignition charge producing hot jets of combusting fuel that ignite a larger main charge typically of the same fuel in a cylinder.

Engine system 10 also includes a gaseous fuel engine control system 70 ("fuel control system 70"). Fuel control system 70 includes an electronic fueling control unit 72 ("electronic control unit 72") having a processor 74 such as a microprocessor or a microcontroller, and a computer readable memory 76 that is part of or otherwise coupled to electronic control unit 72. Computer readable memory 76 can include any suitable volatile or non-volatile computer readable memory such as RAM, ROM, SDRAM, EEPROM, FLASH, a hard drive, or still another, and stores program control instructions and data for operating engine system 10 according to the principles discussed herein.

Fuel control system 70 may also include a plurality of sensors each structured to monitor different engine operating parameters, and in the illustrated embodiment including an engine sensor 78 that monitors an operating parameter of engine 12 that is indicative of or can be used in determining, inferring, or estimating an engine load. Engine sensor 78 may include an engine speed sensor, a mass airflow sensor positioned in intake system 18, or still another. Those skilled in the art will be familiar with various non-virtual and virtual sensor strategies for determining, inferring, or estimating engine load.

Control system 70 may also include one or more exhaust sensors 80. In one embodiment, exhaust sensor 80 includes an exhaust temperature sensor. In another embodiment, exhaust sensor 80 includes an emissions sensor such as a NOx sensor or a GHG sensor. Emissions levels could also be estimated based upon known relationships among other engine operating parameters. Embodiments may include both an exhaust temperature sensor and an emissions sensor.

Control system 70 may also include a combustion sensor 82. Combustion sensor 82 may be an in-cylinder sensor such as an in-cylinder pressure sensor exposed to a fluid pressure of one of cylinders 16 to monitor a combustion parameter such as in-cylinder pressure that is indicative of combustion phasing. Combustion phasing as contemplated herein may include timings of a start of combustion and an end of combustion, a duration of combustion, pressure rise rates or pressure profiles, or still other factors. Each of cylinders 16 will typically be equipped with a combustion sensor. Fuel supply 62 may be a pressurized storage tank containing gaseous molecular hydrogen. Control system 70 may also include a tank level sensor 84 that monitors a tank level or a relative tank level of fuel supply 62.

Figure 2:
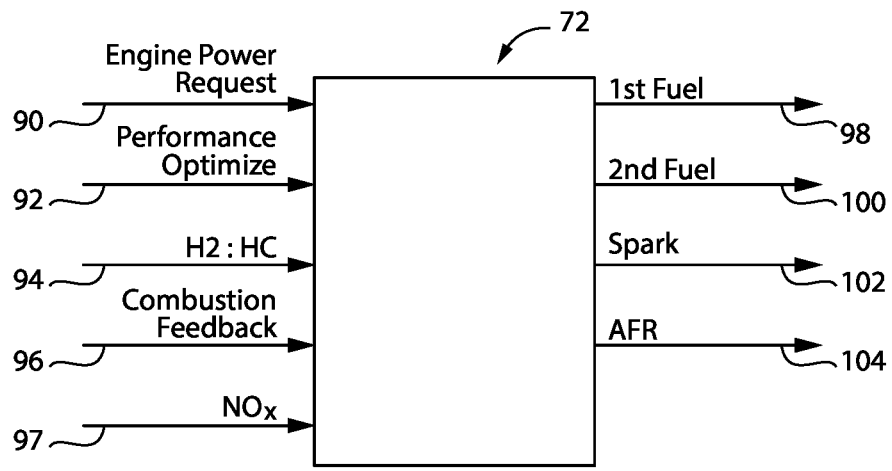
FIG. 2 is a functional block diagram of an electronic control unit, according to one embodiment.

Referring now also to FIG. 2, there is shown a functional block diagram of electronic control unit 72 including a number of inputs and a number of outputted commands. The inputs may include an engine power request 90, such as an increased engine power output request or a decreased engine power output request, and a performance optimization input 92. Performance optimization input 92 may include a user-inputted selection, such as via a dial, button, knob, touchpad, etc., to optimize for a variety of different goals such as engine power or emissions level limits.

In one example, input 92 might include a numerical input from 1-5, with 1 corresponding to highly or completely prioritizing satisfaction of engine power output demand over limiting an emissions level such as a GHG level, and a 5 corresponding to highly or completely prioritizing limiting an emissions level over satisfying power demand. Numerical inputs 2-4 might correspond to a sliding scale of prioritizing power demand versus limiting emissions level. The inputs may also include an H2:HC ratio input 94 indicative of a real time ratio of H2 to HC combusted in engine 12, a combustion feedback input 96, and an emissions level input 97 such as a NOx level or a GHG level. The combustion feedback input 96 may include input from a sensor structured to monitor a combustion phasing in one or more of cylinders 16. In an embodiment, sensor 82 includes a combustion phasing sensor such as an in-cylinder pressure sensor that can monitor cylinder pressures indicative of combustion phasing in the respective cylinder 16 as noted above. Emissions level input 97 may include a sensed emissions level in exhaust from engine 12 as may be produced by sensor 80, or an estimated or inferred emissions level based on other monitored engine operating parameters. Engine speed, engine load, exhaust temperature, and various other inputs not specifically shown might also be received. Electronic control unit 72 is further structured, based on the respective inputs, to output a first fueling control command 98 to gaseous fuel admission valve 52, a second fueling control command 100 to gaseous fuel admission valve 56, a spark ignition command 102 to sparkplug 68, and an AFR command 104 to intake airflow control element 72.

Electronic control unit 72 may thus be structured to receive an engine power output request, and to output a fueling control command, based on the engine power output request to at least one of first gaseous fuel admission valve 52 or second gaseous fuel admission valve(s) 56 to vary a power output of gaseous fuel engine 12. Engine power request 90 may include a request to increase engine power output, and electronic control unit 72 responds by boosting engine power output of engine 12 via one or more fueling control commands. In an electrical power generation context, an increased engine power output request may be based on an increased electrical load demand on an electrical generator operated via a gaseous fuel engine.

Fueling control command(s) 98 and/or 100 may increase or decrease a fueling rate of engine 12 and at the same time vary a ratio of H2 and HC combusted in cylinder(s) 16. Fueling control command(s) 98 and/or 100 might also vary a ratio of H2 and HC without changing a fueling rate of engine 12. For instance, varying a ratio of H2 and HC by decreasing a ratio of H2 to HC could increase a total energy content of gaseous fuel delivered to engine 12, thus responding to an increased power output request by varying a ratio of H2 and HC without varying a total amount of fuel that is admitted. Decreased engine power output requests could be responded to by increasing a ratio of H2 to HC.

Electronic control unit 72 is further structured to output an in-cylinder combustion command, including for example spark ignition command 102 or AFR command 104, varying an in-cylinder combustion parameter based on a varied ratio of H2 and HC admitted by way of first gaseous fuel admission valve 52 and second gaseous fuel admission valve 56. Spark timing and AFR may both be adjusted via in-cylinder combustion commands.

Those skilled in the art will be familiar with the concept of derating an engine. In the case of operating on both H2 and HC, an operator may be faced with a tradeoff between satisfying a requested engine power output or satisfying other performance parameters such as maintaining an emissions level below a target level. A desire to minimize or limit certain emissions, such as GHG emissions, could require producing less engine power output than what might be ideally provided given limitations on power output if burning H2, on the one hand, versus higher emissions such as NOx if burning HC, on the other hand. Put differently, the engine might need to be operated at something less than a rated load level to avoid outputting an emissions level greater than desired, or the emissions level must be increased if the requested power output is to be met. In the case of electrical power generation applications, operators may routinely desire to adjust engine power output to satisfy electrical power demands of a local or regional power grid, or even an electrically power device or system.

Figure 4:
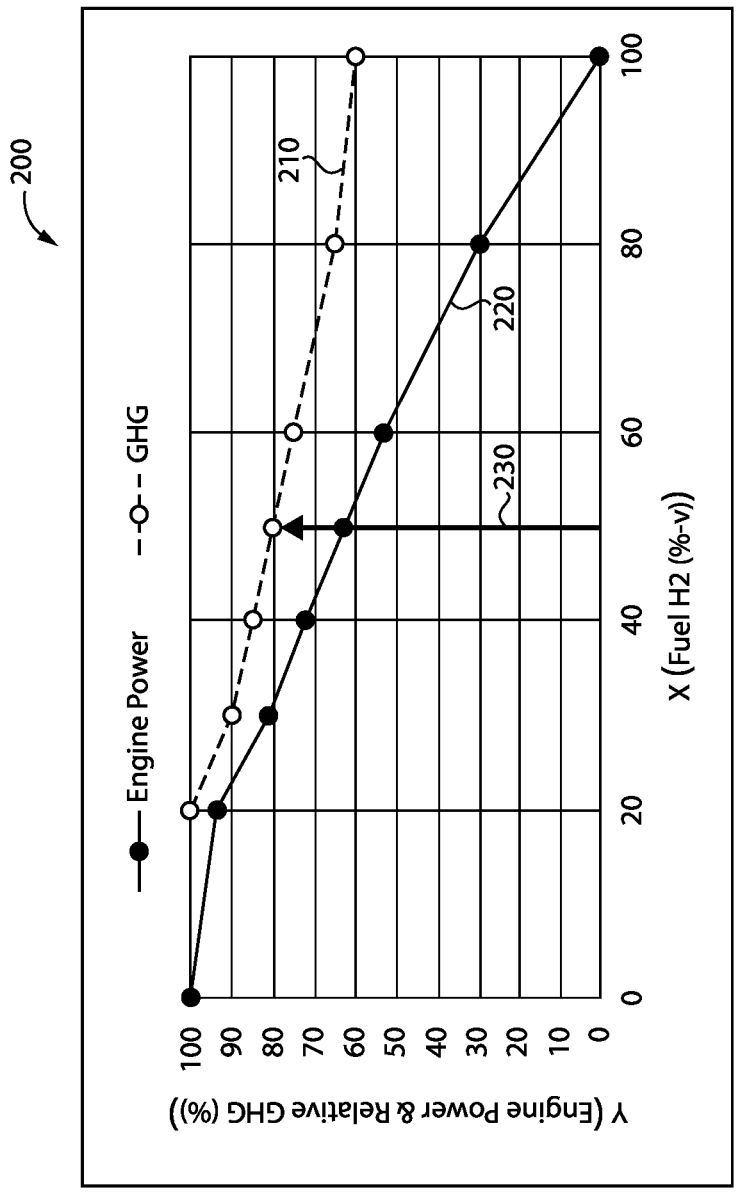
FIG. 4 is a graph illustrating engine power output and emissions level for a range of hydrogen to hydrocarbon ratios.

Referring to FIG. 4, there is shown a graph 200 illustrating engine power and relative GHG percent on the Y-axis, and fuel H2% by volume on the X-axis. A line 210 generally indicates engine power obtained with increasing H2%, and a line 220 generally indicates GHG emission levels that can be obtained at the varied H2%. It can be seen from FIG. 4 that GHG levels generally drop toward 0 as H2% increases toward 100%. Engine power also decreases as H2% increases, and to a relatively greater extent than the GHG emissions decrease. In an electrical power generation application, for example, at times a requested engine power output may be less than a power output available at a rated or max load level. At other times, such as during peak shaving operations, an operator may wish to increase engine power output to a rated load level, for example, 80%. In FIG. 4 a line 230 extends generally upwards through lines 210 and 220 at approximately 50% H2. If an operator needs to be able to operate an engine at approximately 80% load at least some of the time, then a maximum H2% that can be supplied to the engine in this example is about 50% H2, as higher concentrations of H2 will not be able to provide enough energy to satisfy engine power output demands. The engine must therefore be derated if greater than 50% H2 is to be used.

According to the present disclosure, limiting perturbation to a performance profile of a gaseous fuel engine can include limiting a derate to a gaseous fuel engine. Limiting a derate to an engine means limiting the relative extent to which engine load level must be reduced below a rated load level for that engine. An operator can operate an engine on relatively higher concentrations of H2 at lower load levels to minimize GHG emissions or for other purposes and respond to requests for operation at higher load levels by supplementing with HC to selectively boost the engine power output level. By varying an in-cylinder combustion parameter such as spark timing and/or AFR operation of the engine can proceed without perturbation to a desired performance profile. Directionally, when H2 concentration is increased relative to HC spark timing can be advanced in view of the faster flame speed of hydrogen. When H2 concentration is decreased relative to HC spark timing can be retarded. With respect to AFR when H2 concentration is increased relative to HC, AFR can be increased to make the fuel and air mixture leaner. When H2 concentration is decreased relative to HC, AFR can be decreased to make the fuel and air mixture richer. In this general manner an operator can run a gaseous fuel engine on as high a concentration of H2 as is practicable much of the time, or as high as desired, to maintain emissions levels within desired limits, and supplement with HC to increase power output of the engine when necessary to satisfy a power output request. In some instances, an increased engine power output request can be satisfied solely by an increased amount of HC admitted to the engine. In other instances, an increased engine power output could be satisfied by increasing amounts of both HC and H2. In still other instances, a power output request might be satisfied solely by increased admission of H2. Limiting perturbation to a performance profile may also include limiting increases to an emissions level, such as limiting an increase in NOx or GHG emissions, or perturbations to various other engine operating parameters that would otherwise occur in response to variations in a ratio of H2 to HC that is combusted.

INDUSTRIAL APPLICABILITY

Figure 3:
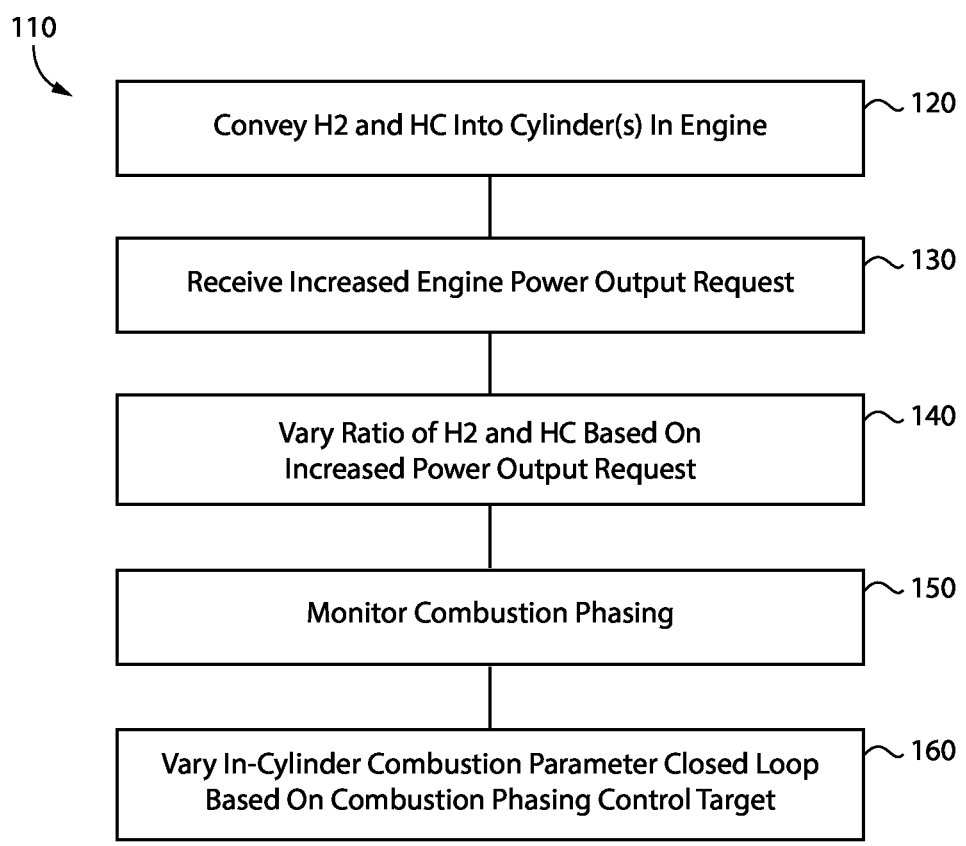
FIG. 3 is a flowchart illustrating example methodology and logic flow, according to one embodiment.

Referring to the drawings generally, but now focusing on FIG. 3, there is shown a flowchart 110 illustrating example methodology and logic flow, according to one embodiment. At a block 120 H2 and HC are conveyed into cylinders 16 in engine 12 for combustion. From block 120 flowchart 110 advances to a block 130 to receive an increased engine power output request. The increased engine power output request could be provided from a human operator or a supervisory controller, for example. From block 130 flowchart 110 advances to a block 140 to vary a ratio of H2 and HC based on the increased power output request, boosting a power output of the gaseous fuel engine. It will be recalled that varying a ratio of H2 and HC might include conveying an increased amount of HC into cylinders 16. In an embodiment, an increased engine power output request can be satisfied by way of combustion of the increased amount of HC. The increased amount of HC may be admitted at a fumigation admission location, such as by way of admission valve 52, but potentially at a port injection or direct injection location. In other instances, varying a ratio of H2 and HC based on an increased power output request could include boosting a power output by increasing an amount of H2 conveyed to cylinders 16, so long as the increased power output can be satisfied.

From block 140 flowchart 110 advances to a block 150 to monitor combustion phasing. It will be recalled that an in-cylinder parameter can include combustion phasing, such as may be indicated by way of data produced by sensor 82. Conveying an increased amount of HC may also include ramping up a concentration of HC admitted into cylinder 16. Ramping up a concentration of HC can be understood as gradually increasing an amount of additional HC that is admitted. Based on monitoring combustion phasing as in block 150, electronic control unit 72 may closed loop control the in-cylinder combustion parameter to a combustion phasing control target, such as a start of combustion timing, an end of combustion timing, a combustion duration, etc., during the ramping up a concentration of HC admitted into cylinders 16 as in a block 160.

While the example discussed above includes responding to an increased engine power output request by supplementing with additional HC, it will be appreciated that a decreased engine power output request could be responded to in a generally analogous manner by reducing an amount of additional HC. Moreover, an engine could be operated by increasing or decreasing both HC and H2 to satisfy an engine power output request, with control of in-cylinder combustion parameters leveraged to limit perturbations to an engine performance profile.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having." or the like are intended to be open-ended terms. Further, the phrase "based on" is intended to mean "based, at least in part, on" unless explicitly stated otherwise.

What is claimed is:

1. A method of operating a gaseous fuel engine system comprising:
   conveying a gaseous hydrogen fuel (H2) and a gaseous hydrocarbon fuel (HC) into a cylinder in a gaseous fuel engine for combustion;
   receiving an increased engine power output request;
   boosting a power output of the gaseous fuel engine based on the increased engine power output request at least in part by varying a ratio of the H2 and the HC combusted in the cylinder; and
   varying an in-cylinder combustion parameter based on the varying a ratio of the H2 and the HC; and
   limiting perturbation to a performance profile of the gaseous fuel engine based on the varying an in-cylinder combustion parameter;

wherein boosting a power output of the gaseous fuel engine includes boosting the power output to a rated engine load level, and the limiting perturbation includes limiting a derate to the gaseous fuel engine.

2. The method of claim 1 wherein the conveying H2 and HC into a cylinder includes conveying H2 and HC into a plurality of cylinders in the gaseous fuel engine via a common conduit.

3. The method of claim 2 further comprising admitting the H2 at a port injection location or a direct injection location, and admitting the HC at a fumigation admission location.

4. The method of claim 1 wherein the boosting a power output of the gaseous fuel engine further includes increasing an amount of the HC conveyed into the plurality of cylinders.

5. The method of claim 4 wherein the increased engine power output request is based on an increased electrical load demand on an electrical generator operated via the gaseous fuel engine.

6. The method of claim 5 further comprising satisfying the increased engine power output request via combustion of the increased amount of the HC.

7. The method of claim 1 wherein the in-cylinder combustion parameter includes a spark timing parameter.

8. The method of claim 1 wherein the in-cylinder combustion parameter includes an air-fuel ratio parameter.

9. The method of claim 1 further comprising closed loop controlling the in-cylinder combustion parameter to a combustion phasing control target, during the varying a ratio of the H2 and the HC.

10. A gaseous fuel engine system comprising:
a gaseous fuel engine having a cylinder formed therein;
a fuel system including a first gaseous fuel admission valve and a second gaseous fuel admission valve together structured to admit a gaseous hydrogen fuel (H2) and a gaseous hydrocarbon fuel (HC) at a range of ratios to the cylinder for combustion;
an electronic control unit structured to:
receive an engine power output request;
output a fueling control command, based on the engine power output request, to at least one of the first gaseous fuel admission valve or the second gaseous fuel admission valve to vary a power output of the gaseous fuel engine; and
output an in-cylinder combustion command varying an in-cylinder combustion parameter based on a varied ratio of the H2 and the HC admitted via the first gaseous fuel admission valve and the second gaseous fuel admission valve;
wherein the electronic control unit is further structured via outputting the fueling control command and the in-cylinder combustion command to limit perturbation to at least one of an emissions level or a maximum available load level of the gaseous fuel engine.

11. The engine system of claim 10 wherein one of the first gaseous fuel admission valve or the second gaseous fuel admission valve includes a fumigation admission valve, and the other of the first gaseous fuel admission valve or the second gaseous fuel admission valve includes an injection admission valve.

12. The engine system of claim 10 wherein:
the engine power output request includes an increased engine power output request; and
the electronic control unit is further structured via outputting the fueling control command to increase an amount of the HC conveyed to the cylinder in satisfaction of the increased engine power output request.

13. The engine system of claim 10 wherein the engine power output request includes an increased engine power output request; and
the electronic control unit is further structured via the fueling control command to increase an amount of the H2 conveyed to the cylinder in satisfaction of the increased engine power output request.

14. The engine system of claim 10 further comprising a spark ignition device, and an air-fuel-ratio (AFR) valve, and the in-cylinder combustion parameter includes a spark timing parameter or an AFR parameter.

15. The engine system of claim 10 wherein the electronic control unit is further structured to vary the in-cylinder combustion parameter closed loop to a combustion phasing control target.

16. A gaseous fuel engine control system comprising:
an electronic control unit structured to:
receive an engine power output request for a gaseous fuel engine operating on a gaseous hydrogen fuel (H2) and a gaseous hydrocarbon fuel (HC);
output a fueling control command to a gaseous fuel admission valve to vary a power output of the gaseous fuel engine based on the engine power output request; and
output an in-cylinder combustion command varying an in-cylinder combustion parameter based on a varied ratio of the H2 and the HC admitted in response to the fueling control command to limit perturbation to a performance profile of the gaseous fuel engine including at least one of an emissions level or a maximum available load level of the gaseous fuel engine.

17. The control system of claim 16 wherein the engine power output request includes an increased engine power output request, and the electronic control unit is further structured via outputting the fueling control command to increase an amount of the HC admitted in satisfaction of the increased engine power output request.

18. The control system of claim 16 wherein the electronic control unit is further structured to vary the in-cylinder combustion parameter closed loop to a combustion phasing control target.

* * * * *